R. N. B. KIRKHAM.
HAY-DERRICK AND STACKER.

No. 191,598. Patented June 5, 1877.

WITNESSES:
Francis McArdle,
J. H. Scarborough.

INVENTOR:
R. N. B. Kirkham,
BY
ATTORNEYS.

UNITED STATES PATENT OFFICE.

RICHARD N. B. KIRKHAM, OF KANSAS, ILLINOIS.

IMPROVEMENT IN HAY DERRICKS AND STACKERS.

Specification forming part of Letters Patent No. 191,598, dated June 5, 1877; application filed May 12, 1877.

*To all whom it may concern:*

Figure 1:
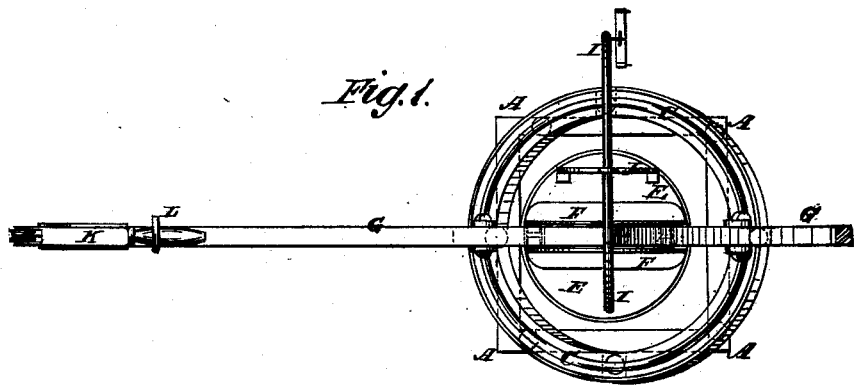
Figure 2:
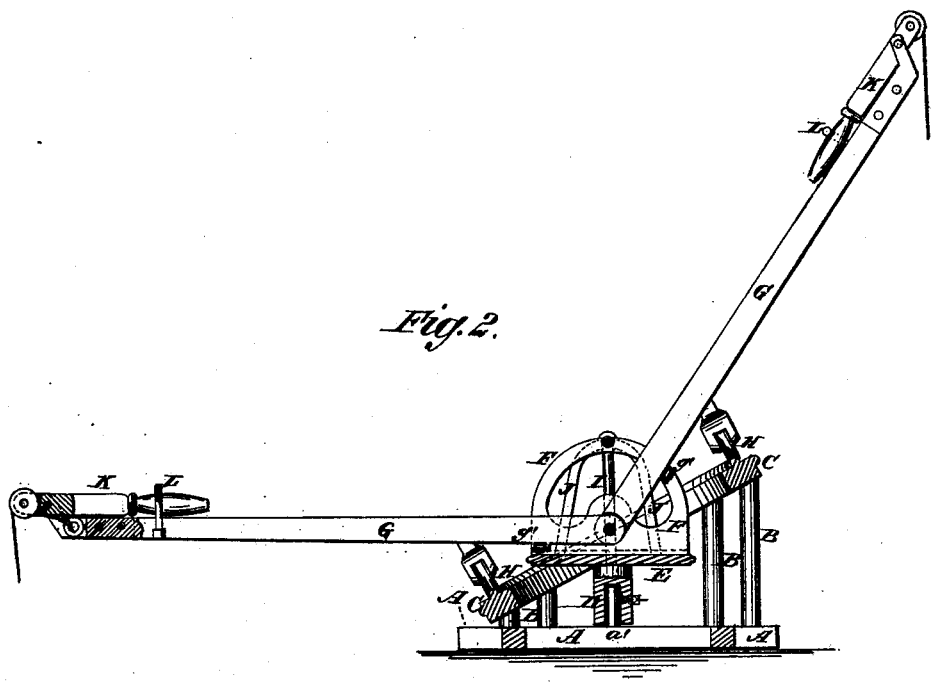

Be it known that I, RICHARD N. B. KIRKHAM, of Kansas, in the county of Edgar and State of Illinois, have invented a new and useful Improvement in Hay Derrick or Stacker, of which the following is a specification:

Figure 1 is a top view of my improved machine. Fig. 2 is a side view of the same, partly in section, to show the construction.

Similar letters of reference indicate corresponding parts.

The object of this invention is to furnish an improved machine for elevating hay in stacking it in the field which shall be simple in construction, inexpensive in manufacture, convenient in use, and effective in operation, enabling the hay to be raised upon the stack faster, and with less labor of man and horse, than is possible with the machines for this purpose now in use.

The invention consists in the combination of the inclined circular track and its supporting frame-work, the circular plate and its pivoting-shaft, the two parallel semicircular plates, and the two levers and their wheels with each other; and in the combination of the curved draw-rod or sweep and its brace with the circular plate, and the two parallel semicircular plates, the two levers, and their wheels, as hereinafter fully described.

A is the base-frame of the machine, which rests upon the ground, and to which is attached a circle of eight or more short posts, B. To the upper ends of the posts B is attached an inclined track, C, which may be formed of cast or wrought iron, and the rib or rail of which may be formed solid with it, or may be a round or half round rod attached to it. To the center of the base-frame A is attached a pivot or step, $a'$, to which is pivoted the lower end of a short shaft, D. To the upper end of the shaft D is attached a small circular plate or turn-table, E, to the upper side of which are attached two vertical parallel semicircular plates, F. To and between the plates F, at the centers of the circles of which they form parts, are pivoted the inner ends of two levers, G. The inner ends of the levers G are halved or otherwise framed to each other, in such a way that they may both be in the same vertical plane, and may both be pivoted by the same pivot. To the levers G are pivoted small friction-rollers $g'$, to bear against the plates F, and diminish the friction as the said levers move up and down between the said plates. To short arms formed upon or attached to the levers G are pivoted small grooved wheels H, which roll along the track C.

I is a rod, the end of which is attached to the plate E, and which is curved upward and inward, passes through a notch in the upper edges of the semicircular plates F, is attached to an arched brace-bar, J, attached to the plate E, and its outer or free end extends down upon the outer side of the track C into proper position to receive the whiffletree, to which the horse is attached, the said rod I rising so high as to clear the highest part of the track C.

To the outer ends of the levers G are hinged, preferably with a swivel-hinge, short levers K, to the hinged ends of which are pivoted pulleys, around which passes the rope of a harpoon or other hay-fork, the end of said rope being attached to the ends of the levers G.

The levers K, when turned back, are fastened by a hook, L, swiveled to the said levers G.

With this construction, as the plate E is turned by the horse the levers G, alternated, ascend and descend as they move around the track C, and as each lever reaches its lowest point the attendant thrusts its fork into the hay and loads it, and as each lever reaches its highest point he trips the fork, and allows the hay to drop upon the stack.

The trip-rope of the forks is designed to extend from the outer end of one of the levers G to the outer end of the other.

By this arrangement one man can load and unload the forks and drive the horse, so that a driver will not be needed.

Having thus described my invention, I claim as new and desire to secure by Letters Patent—

1. The combination of the inclined circular track C and its supporting frame-work A B, the plate F and its pivoting shaft D, the two parallel semicircular plates F, and the levers G and their wheels H with each other, substantially as herein shown and described.

2. The combination of the curved draw-rod or sweep I and its brace J with the circular plate E, the two parallel semicircular plates F, the levers G, and the track O, substantially as herein shown and described.

RICHARD N. B. KIRKHAM.

Witnesses:
CHARLES T. ESTES,
A. H. ESTES.